Oct. 20, 1925.
H. V. LUDWICK
1,558,025
TIRE VALVE ATTACHMENT FOR DUAL TIRES
Filed Sept. 2, 1921
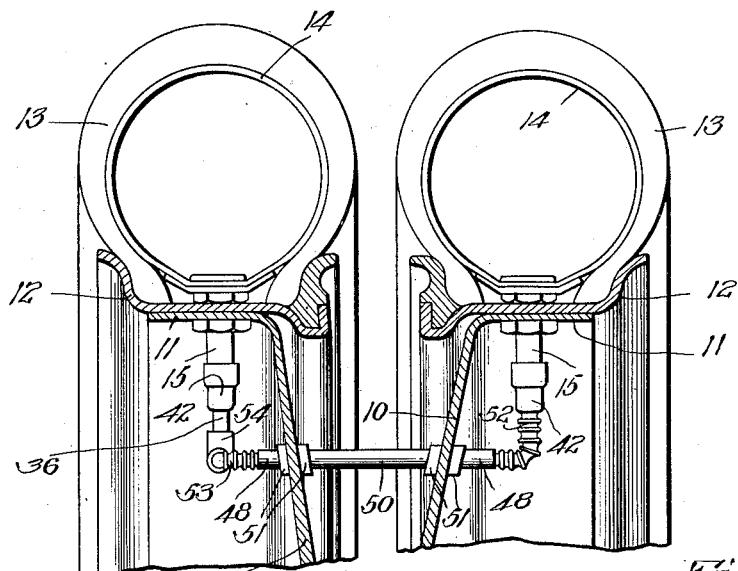
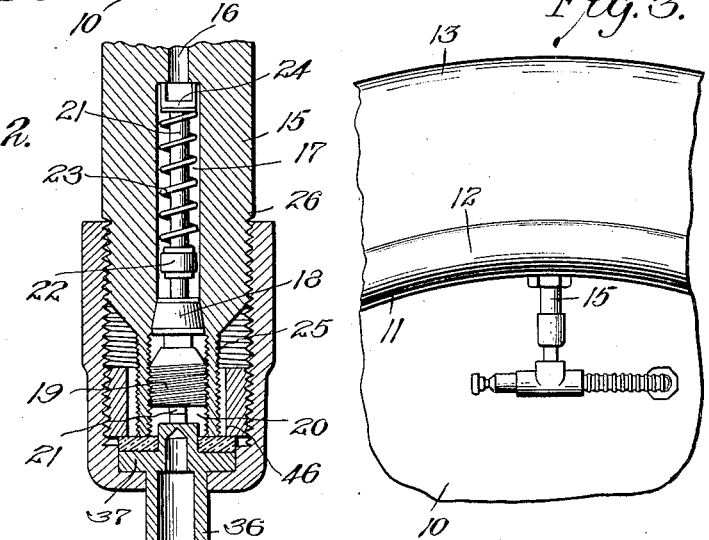
Inventor:
Herbert V. Ludwick
By Attorney
John P. Fairbox Patented Oct. 20, 1925.

1,558,025

UNITED STATES PATENT OFFICE.

HERBERT V. LUDWICK, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

TIRE-VALVE ATTACHMENT FOR DUAL TIRES.

Application filed September 2, 1921. Serial No. 497,855.

*To all whom it may concern:*

Be it known that I, HERBERT V. LUDWICK, a citizen of the United States, residing at Philadelphia, Pennsylvania, have invented certain new and useful Improvements in Tire-Valve Attachments for Dual Tires, of which I declare the following to be a full, clear, and exact description.

This invention relates to improvements in tire valve attachments for disc wheels.

The chief object of my invention is to provide an attachment for inflating or deflating both tires of a dual wheel from the outside of the wheel and for maintaining equal pressures in both of such tires.

Further objects, and objects relating to details and economies of operation and construction, will definitely appear from the detailed description to follow. My invention is clearly defined and pointed out in the appended claims. Structures constituting preferred embodiments of my invention are illustrated in the accompanying drawings, forming a part of this specification, in which:—

Fig. 1 is a sectional view through part of a dual disc wheel showing a tire-valve attachment embodying my invention.

Fig. 2 is an enlarged, sectional view through the attachment, parts being broken away, and Fig. 3 is a view in elevation of the outer disc showing the tire-valve attachment.

In the drawings, the same reference numerals refer to the same parts throughout the several views, and the sectional views are taken looking in the direction of the arrows at the ends of the section lines.

In general, my invention consists in providing a valve at the outer side of the wheel disc and connected by tubing to the tire-valves, which may be of ordinary construction, said tubing being detachably secured to the tire-valves by a coupling which, when in place, acts to hold the tire-valves open. This tubing connecting the two valves may well be flexible so as to permit the use of different makes of tires, having valve-stems of varying length, on the wheel without changing the attachment. This permits the inflating or deflating of the tire from the outside of the wheel and, also, insures an equal pressure in the two tires since there is free communication between the two.

In Figs. 1, 2 and 3, I have shown one embodiment of my invention in connection with a dual wheel. This wheel comprises the discs, 10, mounted face to face on the hub, each disc being provided with a peripheral flange, 11, to which a rim, 12, is secured. Each rim carries a tire, 13, and inner tube, 14, provided with the usual valve stem, 15, and containing the standard tire-valve construction consisting of the valve stem, 15, having an enlarged valve chamber, 17, in the bore, 16. This tire valve includes the valve seat, 18, carried by the screw plug, 19, which is screwed into the internally threaded bore, 20, of the valve chamber. A plunger, 21, is slidably mounted in screw plug, 19, valve seat, 18, and the washer, 24, and carries a valve, 22, which cooperates with the valve seat, 18. The valve, 22, is normally held against the valve seat, 18, by the pressure of spring, 23, but it may be held open by pressure on the outer end of plunger, 21, acting against spring, 23. The outer end of the valve stem, 15, is reduced in diameter and externally threaded, at 25, and a valve cap (not shown) is usually screwed on this part. A dust cap (not shown) is usually screwed on the externally threaded part, 26, of the valve stem. A section of tubing, 50, extends through the two discs, 10, being secured in place by washers, 51. The inner end of this tube, 50, is connected by a length, 52, of flexible tubing and a depressor coupling, of the sort which I will describe, to the valve stem of the tire on the inner disc. The outer end of the tube, 50, is connected by a length of flexible tubing, 53, to a T-member, 54. The valve stem of the tire on the outer disc is connected to this T-member, 54, by another depressor coupling, of the type which I will describe and which is effective to hold the tire valve open. In this instance, the plug, 36, of the coupling may be screwed into the T-member, 54. The latter also carries a valve which may be identical in construction with the tire valve, comprising the screw threaded plug, 29, valve seat, 30, valve plunger, 31, valve, 32, and spring, 33. The end of the T-member, 54, is threaded at 55 to receive a valve cap, 34, or to permit an air hose to be attached for inflating the tires. The detachable depressor couplings connected to the valve stems comprise, in this embodiment of my invention, a nut, 42, which is internally threaded and is adapted to screw on the externally threaded end of the valve stem, 15. A plug, 36, is inserted through the opening, 43, of the nut, 42, and the annular shoulder, 37, of this plug, seats on the shoulder, 44, of the nut around this opening, 43. An annular, bone fibre washer, 45, seats on the upper face of the shoulder, 37, and the plug and washer are held in place by the externally threaded ring nut, 46, which is screwed into the nut, 42, and engages the washer, 45. The plug, 36, has an axial bore, 40, which communicates with the smaller bore or passage, 41, and a cylindrical portion, 38, which projects through the washer, 45, and, on the upper face of this cylindrical portion, there is a rib, 39, which extends above the top surface of the washer. This rib is narrower than the cylindrical portion, 38, and narrower than the bore, 41, so that the interior of the nut, 42, is in free and open communication with the bore, 41, through openings, 47, at each side of the rib, 39. The upper end of the flexible corrugated tubing, 52, is connected to the plug, 36, of one of the depressor couplings, so as to make an air tight joint, while the plug, 36, of the other coupling is screwed into the T-member, 54, as indicated above.

It will be observed that both tires may be inflated or deflated from the outside of the outer disc. Furthermore, since both tire-valves are held open by the couplings, there will be equal air pressures in both tires. This is particularly important in dual wheels where the equal distribution of the load between the two tires is not secured if one is inflated more than the other.

I am aware that my invention may be embodied in other forms than those shown here without departing from the spirit thereof, and, therefore, I claim my invention broadly as indicated by the appended claims.

Having thus described my invention, what I claim as new and useful and desire to secure by Letters Patent is:—

1. The combination with a wheel comprising a pair of discs each carrying a tire having the usual tire valve, an inflating tube carried by said wheel, a fitting at the outer end of said tube, a check valve in said fitting, and coupling members detachably connecting the tube to said tire-valves and holding the tire-valves open.

2. The combination with a wheel carrying a pair of tires each having the usual tire-valve, an inflating tube carried by the wheel, detachable coupling members connecting said tube to said tire valves, said coupling members operating to hold the said valves open, and a check valve at the inlet end of said inflating tube.

3. The combination with a wheel comprising a pair of discs, each carrying a tire having the usual tire valve, of an inflating tube passing through both discs and carried thereby, a coupling member detachably connecting the inner end of said tube with the tire valve of the innermost tire and holding said valve open, an inlet member connected to the outer end of said tube, a check valve in said inlet member, and a coupling member detachably connecting said inlet member and the tire valve of the outermost tire and holding said valve open.

In testimony whereof, I affix my signature.

HERBERT V. LUDWICK.